United States Patent [19]

Chernega et al.

[11] Patent Number: 5,028,483

[45] Date of Patent: Jul. 2, 1991

[54] MAGNETIC RECORDING MEDIUM COMPRISING ACICULAR DENDRITE FREE IRON OXIDE MAGNETIC PIGMENT PARTICLES

[75] Inventors: John G. Chernega, Stillwater; Verna M. Kubik, Village of Houlton, both of Wis.

[73] Assignee: Minnesota Mining and Manufacturing Company, St. Paul, Minn.

[21] Appl. No.: 531,848

[22] Filed: Jun. 1, 1990

[51] Int. Cl.$^5$ ............................................. G11B 23/00
[52] U.S. Cl. .................................. 428/329; 428/423.1; 428/694; 428/900; 252/62.56
[58] Field of Search ............. 428/900, 694, 329, 423.1

[56] References Cited

U.S. PATENT DOCUMENTS

| | | | |
|---|---|---|---|
| 4,202,871 | 5/1980 | Matsumoto et al. | 423/32 |
| 4,299,882 | 10/1981 | Togawa et al. | 428/329 |
| 4,307,154 | 12/1981 | Hosaka et al. | 428/413 |
| 4,693,931 | 9/1987 | Andoh et al. | 428/328 |
| 4,773,931 | 9/1988 | Mishima et al. | 75/251 |
| 4,774,072 | 9/1988 | Arndt et al. | 423/633 |

FOREIGN PATENT DOCUMENTS 56109129 4/1983 Japan .

OTHER PUBLICATIONS

Corradi et al., IEEE Transactions, vol. 20, No. 1, pp. 33-38 (Jan. 1984).
"The Microstructure of gamma-$Fe_2O_3$ and Its Effects on the Magnetization Properties"; S. J. Andress et al.; IEEE Transactions on Magnetics, vol. Mag-22, No. 5, Sep. 1986, pp. 1341-1348.

Primary Examiner—Merrell C. Cashion, Jr.
Assistant Examiner—Stevan A. Resan
Attorney, Agent, or Firm—Gary L. Griswold; Walter N. Kirn; David B. Kagan

[57] ABSTRACT

A magnetic recording medium comprising a nonmagnetizable substrate and a magnetizable layer coated onto the substrate. The magnetizable layer comprises about 83 to 89 percent by weight of acicular, substantialy dendrite-free, iron oxide magnetic pigment particles dispersed in a polymeric binder.

26 Claims, 1 Drawing Sheet

MAGNETIC RECORDING MEDIUM COMPRISING ACICULAR DENDRITE FREE IRON OXIDE MAGNETIC PIGMENT PARTICLES

FIELD OF THE INVENTION

This invention relates to magnetic recording media, and in particular to magnetic recording media with a magnetizable layer comprising up to about 89 percent by weight of acicular, substantially dendrite-free, gamma-$Fe_2O_3$ magnetic pigment particles.

BACKGROUND OF THE INVENTION

Magnetic recording media generally comprise a magnetizable layer supported upon a nonmagnetizable substrate. There are two major forms of magnetic recording media. These are particulate magnetic recording media and continuous thin-film magnetic recording media that are deposited onto the substrate using the various chemical and physical vapor deposition techniques. For particulate magnetic recording media, the magnetizable layer generally contains magnetic pigment particles dispersed in a polymeric binder. Examples of magnetic pigment particles include iron oxides such as gamma-$Fe_2O_3$, cobalt-modified iron oxides, chromium dioxide, and metallic particles such as Fe, Co, or CoCr.

Of these types of magnetic pigment particles, magnetic iron oxides such as gamma-$Fe_2O_3$ are the most widely used. The iron oxides useful as magnetic pigment particles have an acicular shape, which is the major source of the magnetic anisotropy of these particles.

Conventional magnetic media formulated with gamma-$Fe_2O_3$ typically contain from 70 to 80 percent by weight of the oxide dispersed in the polymeric binder based on the total weight of the magnetizable layer. It has become desirable to achieve higher weight loadings, e.g., at least 83 percent by weight or more, of gamma-$Fe_2O_3$ in the polymeric binder while maintaining critical physical and mechanical properties such as durability, coating adhesion, cohesion, modulus, and impermeability. Such higher weight loadings would offer the potential for improved electromagnetic performance, namely superior magnetic remanence and output than can be achieved with currently available media.

Until now, however, it is believed that no one else has achieved such higher weight loadings of iron oxide magnetic pigments while maintaining critical physical and mechanical properties, such as durability, coating adhesion, cohesion, modulus, and impermeability. Indeed, it is well known that merely increasing the weight loading of the gamma-$Fe_2O_3$ magnetic pigment in the polymeric binder tends to reduce the durability and composite strength of the resulting media. This failure is documented in the literature as oxide shedding, dusting, head clogging, and dirty running tape.

It is also desirable to achieve improvements in electromagnetic performance, such as simultaneous improvements in maximum output level, signal to print ratio, signal to noise ratio, and sensitivity. Often, however, obtaining an improvement in one of these electromagnetic properties is accomplished at the expense of at least one of the other electromagnetic properties or at the expense of durability. In particular, an improvement in the signal to noise ratio, "S/N", either by signal increase or by noise decrease, previously has been obtained at the expense of the signal to print ratio, "S/P". Bertram et al., J. Audio Eng. Soc., Vol. 28, pp. 690–705 (October 1980).

In short, nothing in the prior art expressly teaches the skilled worker how to achieve higher magnetic oxide loadings and simultaneous improvements in the various electromagnetic properties while, at the same time, maintaining critical physical and mechanical properties, i.e., durability, adhesion, cohesion, and modulus. Our investigations have focused on this problem.

SUMMARY OF THE INVENTION

The present invention provides an improved magnetic recording medium comprising up to about 89 percent by weight of gamma-$Fe_2O_3$ magnetic pigment particles in a magnetizable layer. Preferred embodiments of the invention comprising 86 percent by weight of magnetic pigment particles in the magnetizable layer not only show simultaneous improvements in maximum output level, signal to noise ratio, signal to print ratio, and sensitivity, but are also just as durable as conventional magnetic media comprising only 80 percent by weight of gamma-$Fe_2O_3$ magnetic pigment particles. The present invention is particularly well-suited for audio, video, instrumentation, and data applications in a tape or disc format.

The advantages of the present invention are achieved by a magnetic recording medium comprising a nonmagnetizable substrate and a magnetizable layer coated onto the nonmagnetizable substrate. The magnetizable layer comprises a polymeric binder and from about 83 to about 89 percent by weight of acicular, substantially dendrite-free, gamma-$Fe_2O_3$ magnetic pigment particles dispersed in the polymeric binder.

DESCRIPTION OF THE PREFERRED EMBODIMENTS

The nonmagnetizable substrate of the present invention may be any suitable substrate material known in the art. Examples of suitable substrate materials include, for example, polyesters such as polyethylene terephthalate ("PET"); polyolefins such as polypropylene; cellulose derivatives such as cellulose triacetate or cellulose diacetate; polymers such as polycarbonate, polyvinyl chloride, polyimide, polyphenylene sulfide, polyacrylate, polyether sulphone, polyether ether ketone, polyetherimide, polysulphone, aramid film, polyethylene 2, 6-naphthalate film, fluorinated polymer, liquid crystal polyesters, polyamide, or polyhydric acid; metals such as aluminum, or copper; paper; or any other suitable material.

The polymeric binder of the present invention may be any suitable binder material known in the art. Preferred binder materials contain cross-linkable polyurethane polymers such as the electron-beam curable polyurethane polymers disclosed in U.S. Pat. No. 4,786,657 and assignee's copending application U.S. Ser. No. 07/184,834 filed Apr. 22, 1988; RD676, polycaprolactone a polyurethane polymer available from Minnesota Mining and Manufacturing Company, St. Paul, Minn.;

and the high performance polyurethane ("HPU") polymers disclosed in U.S. Pat. Nos. 4,876,149 and 4,837,082. Another example of a preferred polymeric binder material is a sulfonated, hydroxy-functional polyurethane polymer ("SHPU polymer"), such as the SHPU polymer disclosed in assignee's copending application, U.S. Ser. No. 07/437,646, filed Nov. 16, 1989, which is a continuation in part of U.S. Ser. No. 07/315,304, filed Mar. 1, 1989, now abandoned.

A particularly preferred polymeric binder material is a crosslinkable polyester polyurethane commercially available as Estane 5703 from BFGoodrich Company, Cleveland, Ohio. This polyester polyurethane is obtained by reacting about 50 parts by weight butanediol, about 30 parts by weight adipic acid, and about 20 parts by weight methylene diisocyanate. This preferred polymeric binder material has high pigment loading capabilities and provides a magnetizable layer with improved electromagnetic output and improved signal to noise ratio. Magnetizable layers prepared with this polymeric binder material are also characterized by an excellent balance of mechanical properties, such as durability, coefficient of friction, stiffness, modulus, surface hardness, and resilience.

Optionally, the polymeric binder may also contain a hard resin component in an amount of from 1 to 95 percent by weight based on the total weight of the polymeric binder. Examples of such hard component resins are well known in the art and include the various phenoxy resins, vinyl chloride copolymers, nitrocellulose, and the like. A particular example of a preferred hard component resin is a phenoxy resin commercially available as Phenoxy PKHH from Union Carbide Corporation. Other examples of a hard component resin include: a partially hydrolyzed vinyl chloride-vinyl acetate copolymer commercially available as VAGH from Union Carbide Corporation; an electron beam curable vinyl chloride-alkyl acrylate copolymer such as those described in U.S. Pat. Nos. 4,783,370 and 4,889,895; and a sulfonated, hydroxy-functional, epoxy group-containing vinyl chloride copolymer ("SHEV copolymer") such as MR-120 commercially available from Nippon-Zeon, Ltd. SHEV copolymers are also described in assignee's copending application U.S. Ser. No. 07/437,646, filed Nov. 16, 1989, which is a continuation in part of U.S. Ser. No. 07/315,304 filed Mar. 1, 1989, now abandoned.

Examples of preferred mixtures of these polymeric binder materials which are suitable in the practice of the present invention include a mixture containing 5 to 99 parts by weight of Estane 5703 and 1 to 95 parts by weight of Phenoxy PKHH; a mixture containing 5 to 99 parts by weight of Estane 5703 and 1 to 95 parts by weight VAGH; and a mixture containing 5 to 99 parts by weight of an SHPU polymer and 1 to 95 parts by weight of MR-120.

The magnetizable layer of the present invention also comprises from about 83 to 89, preferably about 84 to about 88, and more preferably about 84–86 percent by weight of acicular, substantially dendrite-free, gamma-$Fe_2O_3$ magnetic pigment particles dispersed in the binder. The percent by weight of magnetic pigment particles is based on the total weight of the magnetizable layer.

Preferred magnetic pigments of the present invention are undoped gamma-$Fe_2O_3$ particles that have an oil absorption number of less than about 40, and more preferably of about 28 to 32 or less. The oil absorption value of a magnetic pigment refers to the weight of low acid, boiled linseed oil taken up by a given weight of dry pigment to form a paste.

The oil absorption number of a pigment can be determined by the Oil Absorption Test. This test was developed based upon ASTM D281-31 (reapproved 1974). The Oil Absorption Test procedure consists of weighing out a precise amount of dry magnetic pigment into a beaker and adding linseed oil dropwise to the magnetic pigment. The mixture is rubbed out using a spatula to thoroughly incorporate just enough linseed oil to produce a stiff, putty-like paste which does not break or separate. The oil absorption number is reported as the amount of oil, expressed as a percent, needed in grams to reach this condition per gram of magnetic pigment present. The absolute density of the magnetic pigment, if unknown from other sources, is determined using a gas displacement Helium Pycnometer such as the Stereopycnometer available from Quantachrome, Syosset, N.Y. Values obtained by the Oil Absorption Test are reproducible to two significant figures when the surface area of the pigment analyzed is less than about 60 $m^2/g$.

Preferred magnetic pigments of the invention are described, for example, in U.S. Pat. Nos. 4,873,010 and 4,773,931. Particularly preferred acicular, substantially dendrite-free, gamma-$Fe_2O_3$ magnetic pigment particles are the ones described in U.S. Pat. No. 4,202,871. This pigment is also described in Corradi et al., IEEE Transactions on Magnetics, Vol. Mag-20, No. 1, pp. 33–38 (January 1984) ("Corradi et al."); and Andress et al., IEEE Transactions on Magnetics, Vol. Mag-22, No. 5, pp. 1,341–1,348 (September 1986). As described in U.S. Pat. No. 4,202,871, this magnetic pigment is prepared hydrothermally from slurries containing $Fe(OH)_3$ and various additives for directing crystal growth. The pigment has an oil absorption number of about 28–32, an acicular shape with an aspect ratio of 6/1, a particle length of about 0.6 microns, and a BET specific surface area of about $23\pm3$ $m^2/g$. As reported in Corradi et al., the particles have a prolate ellipsoid shape such that all magnetic flux lines passing through the particles are parallel to each other. As a result, the particles are believed to be substantially nonpolar.

Figure 1:
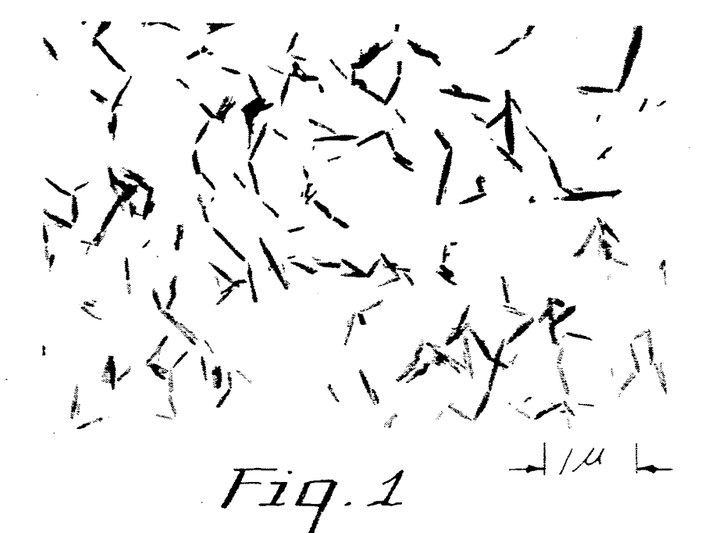
FIG. 1 is an electron photomicrograph showing preferred acicular, substantially dendrite-free, gamma-$Fe_2O_3$ magnetic pigment particles of the present invention.

FIG. 1 is an electron photomicrograph of the particularly preferred magnetic pigment particles described in U.S. Pat. No. 4,202,871. As seen clearly in FIG. 1, a characterizing feature of these particles is their substantially uniform size and shape. It is also seen that the surfaces of the particles are substantially dendrite-free and have no sharp edges. Our investigations have also shown that these magnetic pigment particles show less of a tendency to agglomerate, i.e., form clumps of magnetic pigment particles. This property, among others, makes it possible to achieve higher packing densities with these particles in polymeric binder materials.

Figure 2:
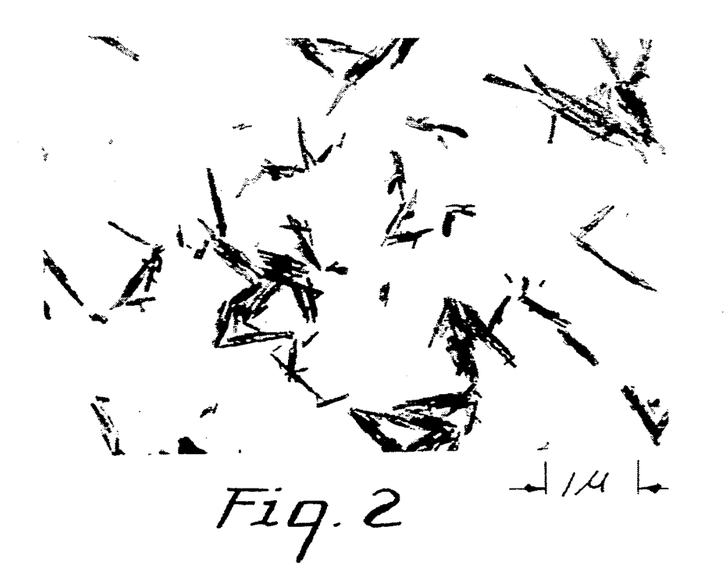
FIG. 2 is an electron photomicrograph showing conventional gamma-$Fe_2O_3$ magnetic pigment particles.

In comparison, FIG. 2 shows conventional acicular, undoped gamma-$Fe_2O_3$ particles having surfaces with dendrites and sharp edges. These particles have an oil absorption number that ranges from about 47.5 to 58.0. As seen clearly in FIG. 2, these particles show a greater tendency to agglomerate into sintered clumps. These clumps of particles are characterized by excessive voids and pack less efficiently than the magnetic pigment particles of the present invention.

Our investigations have shown that magnetic media formulated with from about 83 to about 89 percent by weight of gamma-$Fe_2O_3$ particles are dramatically more durable when formulated with the gamma-Fe$_2$O$_3$ particles of the present invention. In fact, tests have shown that preferred embodiments of the present invention formulated with 86 percent by weight of the acicular, substantially dendrite-free, gamma-Fe$_2$O$_3$ particles shown in FIG. 1 are just as durable as magnetic recording media formulated with only 80 percent by weight of conventional gamma-Fe$_2$O$_3$ particles. This result is surprising, because magnetic media formulated with 83 to 89 percent by weight of conventional gamma-Fe$_2$O$_3$ magnetic pigment particles generally show excessive dusting and tend to fall apart during use.

The magnetizable layer produced in accordance with the present invention optionally may also contain a lubricant in order to increase the lifetime of the recording medium and the transducer means used in the recording/playback apparatus. Examples of suitable lubricants include a carboxylic fatty acid such as lauric acid, myristic acid, palmitic acid, stearic acid, and oleic acid; a carboxylic fatty acid ester such as butyl myristate, butyl stearate, isocetyl stearate, and tridecylstearate; a fluorocarbon compound such as polyperfluoro ethers, alkanes, alcohols, and esters; silicone oils such as dimethyl silicone; and mixtures thereof.

The magnetizable layer may also contain a dispersing agent to facilitate dispersion of the magnetic pigment particles in the polymeric binder material. Any of the known dispersing agents, or mixtures of the known dispersing agents, would be suitable for use in the present invention. Examples of suitable dispersing agents include soy products, phosphates, and anionic, cationic, or nonionic surfactants.

A preferred dispersing agent is a phosphorylated polyoxyalkyl polyol ("POCA") exemplified by the following formula:

In the above formula, m is an integer from 1 to 5. The POCA dispersing agent is fully described in U.S. Pat. No. 4,889,895.

Other preferred dispersing agents include the Emcol dispersing agents such as Emcol Chloride, Emcol Phosphate, and Emcol Acetate available from Witco Chemical, Organics Division, New York, N.Y. The Emcol compounds are polypropoxylated quaternary ammonium based cationic surfactants exemplified by the following formula:

In the above formula, X may be phosphate, acetate, or chloride. The magnetizable layer may also contain an antistatic agent such as carbon black.

The components of the magnetizable layer are dissolved in a suitable solvent to prepare a dispersion which is coated onto the nonmagnetizable substrate. Examples of suitable solvents may include ketones such as acetone, methyl ethyl ketone ("MEK"), methyl isobutyl ketone, or cyclohexanone; alcohols such as methanol, ethanol, propanol, or butanol; esters such as methyl acetate, ethyl acetate, butyl acetate, ethyl lactate, or glycol diacetate; monoethyl ether or the like; tetrahydrofuran; glycol ethers such as ethylene glycol dimethyl ether, or ethylene glycol monoethyl ether; dioxane or the like; aromatic hydrocarbons such as benzene, toluene, or xylene; aliphatic hydrocarbons such as hexane or heptane; nitropropane or the like; and mixtures thereof.

Generally, the magnetizable layer does not adhere well to an extremely smooth polyester film substrate such as a PET film unless the film first receives an adhesion-promoting treatment. Accordingly, before coating a PET film substrate with the dispersion, the substrate is preferably primed in order to improve adhesion of the magnetizable layer to the substrate.

There are two basic approaches for providing such priming treatments. The first approach involves "burning" the surface of the film with a chemical or an irradiating treatment. Examples of such treatments are well known in the art and include corona discharge treatment, chemical treatment with parachlorophenol, ultraviolet radiation treatment, ionizing radiation treatment, and electron beam radiation treatment.

The second approach for providing such priming treatments involves coating the substrate with an adhesion-promoting polymer layer. A variety of such polymer-coated, or "pre-primed", PET film materials are commercially available and are preferred in the practice of the present invention. A particularly preferred pre-primed PET film material is disclosed in U.S. Pat. No. 4,749,617, incorporated herein by reference. Another preferred pre-primed PET film material is disclosed in assignee's copending application U.S. Ser. No. 745,261, filed June 14, 1985, which is incorporated herein by reference.

The dispersion may be applied to the substrate using any conventional coating technique, such as gravure coating techniques or knife coating techniques. The coated substrate is then passed near a magnet to orient the magnetic pigment particles, after which the polymeric binder is dried and cured. Curing is achieved by activating the dispersion with an isocyanate cross-linking agent. Preferably the isocyanate cross-linking agent is polymethylene polyphenyl isocyanate at a hydroxy equivalent index of from about 50 to 500 percent, preferably from about 100 to 300 percent, and more preferably at about 130 percent.

The invention will be further described by reference to the following examples. In all examples, the amount of each ingredient is expressed in terms of parts by weight.

EXAMPLE 1

This example demonstrates the simultaneous improvements in maximum output level ("MOL"), signal to noise ratio ("S/N"), signal to print ratio ("S/P"), and sensitivity ("S") achieved by the present invention.

The maximum output level, i.e., "MOL", of a magnetic recording tape means the maximum output level measured at a particular frequency, e.g., 1 kHz or 10 kHz.

Signal to noise ratio means the ratio of the normal signal voltage to the noise voltage.

Signal to print ratio means the ratio of the measured amplitude of a signal to the amplitude of the same signal printed or transferred magnetically to an adjacent layer in a wound reel of magnetic tape.

Sensitivity means the relative output for a given input in the linear (low distortion) portion of a magnetic recording tape's magnetic transfer characteristics. Sensitivity data plotted as a function of frequency (or wavelength) gives frequency response, usually relative to a standard reference tape.

The samples of magnetic recording tape used in this example were obtained as follows:

Sample 1 was a magnetic recording tape of the present invention containing about 86% by weight of the magnetic pigment shown in FIG. 1 and was prepared from the following ingredients in the following amounts:

| Sample | 1 |
|---|---|
| magnetic oxide loading (dispersion)* | 86% |
| OA | 28 |
| % dispersion solids | 48.0% |
| Toluene | 15.0 |
| Methyl Ethyl Ketone | 63.3 |
| POCA (75% in Toluene) | 4.0 |
| magnetic oxide | 100.0 |
| Emcol Phosphate | 3.0 |
| Lauric Acid | 0.5 |
| Alumina (Al$_2$O$_3$) | 0.5 |
| Estane 5703 (15% in an 80:20 mixture of MEK:Toluene) | 55.0 |

* The magnetic oxide loading (dispersion) as used throughout this Example and the following Examples means the percent by weight of the magnetic oxide based on the total weight of the dry dispersion before activating agents and/or additional lubricants are subsequently added at the time of activation.

Using these ingredients, Sample 1 was prepared as follows. All ingredients were combined and stirred in a large blade mixer until a uniform pre-mix containing no visible aggregates or agglomerates was obtained. A dispersion suitable for roto-gravure coating was obtained by milling the pre-mix in an industrial-sized sand mill in the presence of sand mill media. Samples were removed every two hours and spread on a film-based substrate in order to observe the mixture for uniformity. When finished, the dispersion was sieved, or filtered, in order to separate the dispersion from the sand mill media. The dispersion was activated with polymethylene polyphenyl isocyanate ("PAPI") at a 130% hydroxy equivalent index. At the time of activation, an additional lubricant (dimethyl silicone) was added to the dispersion in an amount of 1% based on the amount of the magnetic pigment present. The activated dispersion was then roto-gravure coated at a thickness of about 500 to 600 microinches onto a 0.015 mm pre-primed, biaxially-oriented polyester film available as ICI Melinex 3265 from ICI America, Inc. The pre-primed film had previously been coated with a backcoat layer. The backcoat layer contained about 30% by weight of carbon black and a soybean lecithin dispersant in a 70:30 blend of Estane 5703 and Phenoxy PKHH. The backcoat had been activated at a 150% OH index with PAPI and catalyzed with 0.2 percent by weight of dibutyltin dilaurate. The coated film was passed through a magnetic field in order to orient the particles in the machine direction to optimize the "squareness", i.e., $\phi r/\phi max$, of the coating. The resulting magnetic recording tape was then heated in an oven to drive off volatile materials and calendered to provide a very smooth magnetic recording surface.

Comparison Samples A and B were two commercially available, state-of-the-art magnetic recording tapes containing about 80% by weight of gamma-Fe$_2$O$_3$ magnetic pigment particles.

Comparison Sample C was a magnetic recording tape containing only 80% by weight of the magnetic pigment shown in FIG. 1 and was prepared as described above from the following ingredients in the following amounts:

| Comparison Sample | C |
|---|---|
| magnetic oxide loading (dispersion) | 80% |
| OA | 28 |
| % dispersion solids | 42.4 |
| Charge I | |
| Toluene | 20.5 |
| Methyl Ethyl Ketone | 52.4 |
| POCA | 6.7 |
| Emcol Phosphate | 1.0 |
| RD676 | 21.4 |
| VAGH | 11.4 |
| magnetic oxide | 100.0 |
| Alumina (Al$_2$O$_3$) | 0.5 |
| Charge II | |
| RD676 | 21.4 |
| Methyl Ethyl Ketone | 21.4 |
| Toluene | 5.2 |
| Charge III | |
| RD676 | 12.9 |
| Methyl Ethyl Ketone | 15.2 |
| Toluene | 5.2 | the maximum output level ("MOL"), signal to noise ratio ("S/N"), signal to print ratio ("S/P"), and sensitivity ("S") for each of these samples were then determined. The results are shown in the following table:

| Sample | 1 | A | B | C |
|---|---|---|---|---|
| MOL at 1 kHz | +3.5 | 0 | −1 | 0 |
| MOL at 10 kHz | +1.5 | 0 | −2 | 0 |
| S/N | +3 | 0 | +1 | 0 |
| S/P | +1.5 | 0 | −3 | −1 |
| S at 1 kHz | +1 | 0 | −1 | −1 |
| S at 10 kHz | +1 | 0 | −2 | −1 |

The values reported in this table are relative values measured against Comparison Sample A, a commercially available mastering tape. All values are reported in units of decibels, i.e., "dB". These results show the significant improvement in electromagnetic performance provided by Sample 1 of the present invention. Improvement in any one of the above-listed electromagnetic properties would have been a significant advance over the prior art, yet the results show that Sample 1 clearly outperformed Comparison Samples A, B, and C in every electromagnetic property measured above. In particular, the +3.5 dB improvement in MOL at 1 kHz is an improvement of about 50% in the MOL at that frequency, and the +3 dB improvement in S/N is an improvement of about 40%. It is also noted that the improvements in MOL and S/N were achieved with a corresponding improvement in S/P of +1.5 dB, i.e., about 15%.

It is also noted with regard to Comparison Sample C that simultaneous improvements in the above-listed electromagnetic properties were not observed when the weight loading of the magnetic pigment particles shown in FIG. 1 was only about 80% by weight.

EXAMPLE 2

The purpose of this example is to show how to convert the magnetic oxide loading (dispersion) to a percent by weight of the magnetic oxide based on the total weight of the magnetizable layer. For Sample 1 of Example 1, this would be determined as follows:

| Ingredient | Parts by Weight | Parts by weight of solids | OH equivalent weight | number of g equivalents OH |
|---|---|---|---|---|
| MEK | 63.3 | 0 | 0 | 0 |
| Toluene | 15.0 | 0 | 0 | 0 |
| POCA (75% in Toluene) | 4.0 | 3 | 420 | .0071 |
| magnetic oxide | 100.0 | 100 | 0 | 0 |
| Emcol Phosphate | 3.0 | 3 | 1100 | .0027 |
| Alumina (Al$_2$O$_3$) | 0.5 | 0.5 | 0 | 0 |
| Lauric Acid | 0.5 | 0.5 | 0 | 0 |
| Estane 5703 (15% in MEK) | 55.0 | 8.25 | 10000 | .0008 |
| Total | 241.3 | 115.25 | — | 0.0106 |

This table shows that the magnetizable layer contains 0.0106 gram equivalents of OH per 241.3 grams of dispersion. Using these values, the grams of PAPI per gram of dispersion at a 130% OH index would be calculated as follows:

$$\frac{0.0106 \text{ g-equiv. OH}}{241.3 \text{ g dispersion}} \times 1.30 \text{ index} \times \frac{135 \text{ g PAPI}}{\text{NCO g equiv.}} = .0077 \text{ g PAPI/g disp.}$$

Next, the amount of lubricant (dimethyl silicone) per gram of dispersion that was added at the time of activation would be determined determined as follows:

$$\frac{1 \text{ g lubricant}}{100 \text{ g magnetic oxide}} \times \frac{115.25 \text{ g solids}}{241.3 \text{ g dispersion}} \times \frac{86 \text{ g magnetic oxide}}{100 \text{ g solids}} = .0041 \frac{\text{g lubricant}}{\text{g dispersion}}.$$

From these values, the percent by weight of magnetic oxide based on the total weight of the magnetizable layer would be determined as follows:

$$100\% \times \frac{.86 \text{ g magnetic oxide}}{1.0 \text{ g dispersion} + .0077 \text{ g PAPI} + .0041 \text{ g lubricant}} = 85\%$$

The hydroxy equivalent weight for each material used throughout these Examples is given in the following table:

| Table of hydroxy equivalent weights for isocyanate crosslinking reaction | |
|---|---|
| HPU | 3,600 |
| ESTANE 5703 | 10,000 |
| RD676 | 10,000 |
| SHPU | 1,730 |
| SHEV | 1,900 |
| POCA | 420 |
| Emcol Phosphate | 1,100 |
| VAGH | 740 |
| Phenoxy PKHH | 284 |
| Lauric Acid | 0 |
| Al$_2$O$_3$ | 0 |
| MEK | 0 |
| Toluene | 0 |
| ∂-Fe$_2$O$_3$ | 0 |
| Dimethyl Silicone | 0 |

EXAMPLE 3

This example further describes the test procedure for determining the oil absorption number of a magnetic pigment. Exactly 2.00 g of magnetic pigment was weighed into a 25 ml glass beaker. If necessary, the pigment had been sieved to remove any pigment agglomerates larger than 1 mm. An indentation was made at the center of the pigment. Linseed oil was added to the pigment with an eyedropper. The acid number of the linseed oil was between 5.2 and 6.0, and the average iodine number was 183±2. Because of the light sensitivity of the linseed oil, it was stored in an amber bottle and kept in a dark place. After adding the linseed oil, a spatula was used to thoroughly mix the oil in the pigment by turning over the pigment into the oil while stirring. It was found that tilting the beaker from 30 to 45 degrees from the vertical was an excellent way to keep the pigment in the smallest possible area so that no excess oil smeared the base or side of the beaker. Clusters of pigment which might contain excess oil were broken up. The test was completed when enough oil had been added to produce a stiff, putty-like paste which does not break or separate. The end point would have been exceeded if smears of oil, or oil and pigment, began to cover the inside of the beaker.

The oil absorption number, in terms of percent, is determined as the weight in grams of oil used per gram of pigment, multiplied by 100. The procedure was performed 5 times, and the three closest values were averaged to obtain an average oil absorption number for the pigment. The average oil absorption number so obtained was then corrected by subtracting the weight percent of the surface active materials (surfactants and acid lubricant) used in the formulation based on the weight of magnetic pigment present. This corrected oil absorption number is the value reported herein.

Using this procedure, the oil absorption numbers of the magnetic pigment shown in FIG. 1 and a number of commercially available gamma-Fe$_2$O$_3$ pigments were determined. Handspreads of the various pigments were then made and various properties of the handspreads and two state-of-the-art, commercially available magnetic recording tapes were measured.

The samples used in this experiment were obtained as follows:

Sample 2 was a handspread of the present invention containing about 89% by weight of the magnetic pigment shown in FIG. 1 and was prepared using the following ingredients in the following amounts:

| | |
|---|---|
| magnetic oxide loading (dispersion) | 89% |
| OA | 28 |
| % dispersion solids | 46% |
| Charge I | |
| Methyl Ethyl Ketone | 77.8 |
| Toluene | 22.2 |
| POCA | 6.7 |
| Emcol Phosphate | 1.0 |
| magnetic oxide | 100.0 |
| Alumina (Al$_2$O$_3$) | 0.5 |
| Charge II | |

| -continued | |
|---|---|
| Methyl Ethyl Ketone | 16.7 |
| Toluene | 11.1 |
| VAGH (30% in MEK) | 1.9 |
| RD676 (25% in MEK) | 9.9 |
| Charge III | |
| Lauric Acid | 0.5 |

These ingredients were combined and stirred in a blade mixer until a uniform pre-mix containing no visible aggregates or agglomerates was obtained. A dispersion was made from this pre-mix by milling the pre-mix in a small sand mill in the presence of sand mill media. Samples were removed every two hours and spread on a film-based substrate in order to observe the mixture for uniformity. When finished, the dispersion was sieved, or filtered, in order to separate the dispersion from the sand mill media. The dispersion was activated with polymethylene polyphenyl isocyanate ("PAPI") at a 130% hydroxy equivalent index. The activated dispersion was then knife-coated at a thickness of about 400 microinches onto a 0.015 mm pre-primed, biaxially-oriented polyester film available as ICI Melinex 3265 from ICI America, Inc. The coated film was passed through a magnetic field in order to orient the particles in the machine direction to optimize the "squareness", i.e., $\phi r/\phi max$, of the coating. The resulting handspread was air dried at room temperature.

Comparison Samples D, E, F, G, H, I, and J were handspreads containing about 80% by weight of various commercially available pigments. Of these, Comparison Sample D contained 80% by weight of the magnetic pigment shown in FIG. 1. Each of Comparison Samples D through J was prepared according to the procedure described above from the following formulation:

| magnetic oxide loading (dispersion) | 80% |
|---|---|
| Charge I | |
| Methyl Ethyl Ketone | 75.0 |
| Toluene | 8.3 |
| POCA | 6.7 |
| Emcol Phosphate | 1.0 |
| magnetic oxide | 100.0 |
| Charge II | |
| RD676 (25% in MEK) | 19.4 |
| Methyl Ethyl Ketone | 12.8 |
| Charge III | |
| RD676 (25% in MEK) | 34.3 |
| Methyl Ethyl Ketone | 22.8 |
| VAGH (30% in MEK) | 11.5 |
| Lauric Acid | 1.0 |

Comparison Samples K and L were the two, state-of-the-art, commercially available tapes.

The results of this experiment are reported in the following table:

| Sample | Hc | Br | Gn | $\phi r/\phi m$ | S/P** | OA |
|---|---|---|---|---|---|---|
| 2 | 400 | 1640 | 4.2 | .87 | +3.4 | 28 |
| D | 389 | 1469 | 3.9 | .87 | −0.5 | 28 |
| E | 404 | 1446 | 2.0 | .79 | +3.0 | 47.5 |
| F | 420 | 1381 | 2.0 | .82 | +2.6 | 53.5 |
| G | 388 | 1508 | 3.8 | .87 | +0.7 | 55.5 |
| H | 395 | 1325 | 3.8 | .87 | +0.4 | 58.0 |
| I | 399 | 1230 | 2.4 | .80 | — | 47.5 |
| J | 415 | 1498 | 3.0 | .83 | −0.6 | 44.5 |
| K | 390 | 1400 | 3.4 | .82 | −1.5 | 49 |

| -continued | | | | | | |
|---|---|---|---|---|---|---|
| Sample | Hc | Br | Gn | $\phi r/\phi m$ | S/P** | OA |
| L | 395 | 1275 | 2.3 | .86 | −4.0 | 77* |

*Sintering made it difficult to obtain an accurate OA for this magnetic pigment.
**For this measurement, a more positive value indicates a better result.

In this table, Hc means the coercivity of a sample. Coercivity is the strength of the magnetic field required to reduce the magnetization to 0 after saturation magnetization of the sample in the opposite direction. Hc is reported in Oersteds.

Br means the remanence of a sample. Remanence is a measure of the magnetization of a sample after an external magnetic field is removed. Br is reported in gauss.

Gn is a dimensionless measure of coercivity distribution given by the expression:

$$Gn = (Hc)/(\Delta Hc)$$

where $\Delta$ Hc is the width of the coercivity range at $\frac{1}{2}$ peak height. Gn is the reciprocal of the switching field distribution.

$\phi r/\phi m$ is the squareness of a sample. Squareness is the ratio of the magnetic flux remaining after removal of an applied magnetic field to the magnetic flux present at an applied saturating magnetic field, e.g., 3,000 Oersteds. Squareness indicates the magnetic switching efficiency of the sample.

S/P is the signal to print ratio in dB as defined in Example 1.

OA is the oil absorption number as defined above.

The results show that at comparable Hc, Sample 2 of the present invention showed better Br, Gn, $\phi r/\phi max$, and S/P than any of the Comparison Samples. It is also noted that these improvements were not observed with Comparison Sample D, which contained only 80% by weight of the magnetic pigment shown in FIG. 1.

EXAMPLE 4

The purpose of this experiment was to show the improved cohesion and adhesion of the magnetizable layer of the present invention. This experiment was performed using the following examples:

Samples 3, 4, and 5 were handspreads of the present invention containing the magnetic pigment shown in FIG. 1, and each was prepared as described using the procedure described in Example 2 from the following ingredients in the following amounts:

| Sample | 3 | 4 | 5 |
|---|---|---|---|
| magnetic oxide loading (dispersion) | 83% | 86% | 89% |
| OA | 28 | 28 | 28 |
| % dispersion solids | 45% | 50% | 50% |
| Charge I | | | |
| Methyl Ethyl Ketone | 87.9 | 74.8 | 74.8 |
| Toluene | 28.6 | 21.0 | 21.8 |
| POCA (75% in MEK) | 4.0 | 4.0 | 4.0 |
| SHPU (35% in MEK) | 46.7 | 35.1 | 24.9 |
| Charge II | | | |
| magnetic pigment | 100.0 | 100.0 | 100.0 |
| Lauric Acid | 0.5 | 0.5 | 0.5 |
| Alumina (Al$_2$O$_3$) | 0.5 | 0.5 | 0.5 |

Comparison Samples M, N, and P were identical to Samples 3, 4, and 5, respectively, except that Comparison Samples M, N, and P contained the magnetic pigment shown in FIG. 2 instead of the magnetic pigment shown in FIG. 1.

In all of the samples, the SHPU polymer was prepared in accordance with Example 3 of assignee's copending application, U.S. Ser. No. 07/429,720, filed Oct. 31, 1989, which is a continuation-in-part of U.S. Ser. No. 07/295,046 filed Jan. 6, 1989, incorporated herein by reference.

The cohesion and adhesion of each of these samples was determined qualitatively by adhering Scotch Brand Magic Tape No. 810 to the magnetizable layer of each sample. The tape was then pulled off, and the amount of debris on the tape was observed. A lesser amount of observed debris was indicative of better cohesion and adhesion. The results were as follows:

| Sample | oxide loading | Observed debris |
|--------|---------------|-----------------|
| 3 | 83% | none |
| 4 | 86% | none |
| 5 | 89% | low |
| M | 83% | none |
| N | 86% | heavy |
| P | 89% | heavy |

As seen by these results, embodiments of the present invention generally show better cohesion and adhesion at higher pigment loadings than the comparison samples.

EXAMPLE 5

The purpose of this experiment was to show the improved modulus of the present invention. The samples used in this experiment were obtained as follows:

Sample 6 was a magnetic recording tape containing about 86% by weight of the magnetic pigment shown in FIG. 1 and was prepared according to the procedure of Example 1 from the following ingredients in the following amounts.

| magnetic oxide loading (dispersion) | 86% |
|---|---|
| OA | 28 |
| % dispersion solids | 48% |
| Charge I | |
| Methyl Ethyl Ketone | 63.3 |
| Toluene | 15.0 |
| POCA (75% in MEK) | 4.0 |
| Emcol Phosphate | 3.0 |
| Estane 5703 (15% in MEK) | 55.0 |
| Charge II | |
| magnetic oxide | 100.0 |
| Lauric Acid | 0.5 |
| Alumina (Al$_2$O$_3$) | 0.5 |

Comparison Sample Q was identical to Sample 6 except that a Comparison Sample Q contained the magnetic pigment shown in FIG. 2 instead of the magnetic pigment shown in FIG. 1.

The Instron magnetic coating modulus of each of these samples was measured in terms kg/cm$^2$ in the primary (machine) direction and the secondary (width) direction. Modulii were measured on the Instron 1122 frame model. The caliper and width of each sample were measured and the following test parameters were set: gauge length at 4 inches, cross-head speed at 1 inch per minute, return limit of 1 inch, data rate at 9 points per second, and full scale load at 10 pounds. The modulii were measured in the tensile mode and were determined by taking the slope of the least squares fit of the longest, straightest portion of the stress-strain curve closest to the origin. The results were as follows:

| Sample | Primary Modulus (kg/cm$^2$) | Secondary Modulus (kg/cm$^2$) |
|--------|---------|---------|
| 6 | $8.65 \times 10^3$ | $10.3 \times 10^3$ |
| Q | $3.94 \times 10^3$ | $4.78 \times 10^3$ |

These results show that the sample of the present invention has a higher modulus in the same formulation at the same pigment loading than the comparison sample.

EXAMPLE 6

The purpose of this experiment was to show the improved durability of the present invention. The samples used in this experiment were obtained as follows:

Samples 7, 8, 9, and 10 were magnetic recording tapes of the present invention containing the magnetic pigment shown in FIG. 1, and each was prepared using the procedure described in Example 1 from the following ingredients in the following amounts:

| Sample | 7 | 8 | 9 | 10 |
|---|---|---|---|---|
| magnetic oxide loading (dispersion) | 86% | 86% | 86% | 86% |
| OA | 28 | 28 | 28 | 28 |
| % dispersion solids | 50% | 50% | 50% | 50% |
| Charge I | | | | |
| Methyl Ethyl Ketone | 42.0 | 46.0 | 76.0 | 75.0 |
| Toluene | 9.3 | 11.3 | 22.3 | 22.3 |
| POCA (75% in Toluene) | 4.0 | 4.0 | 4.0 | 4.0 |
| Emcol Phosphate | 1.0 | 1.0 | 1.0 | 1.0 |
| HPU (40% in MEK)* | — | — | 28.3 | 24.0 |
| VAGH (30% in MEK) | — | 5.3 | — | 5.3 |
| Estane 5703 (15% in MEK) | 75.0 | 64.0 | — | — |
| Charge II | | | | |
| magnetic oxide | 100.0 | 100.0 | 100.0 | 100.0 |
| Lauric Acid | 0.5 | 0.5 | 0.5 | 0.5 |
| Alumina (Al$_2$O$_3$) | 0.5 | 0.5 | 0.5 | 0.5 |

*In this example, the HPU polymer was the multihydroxyl-functional urethane II prepared as described at col. 9, lines 10 to 40 of U.S. Pat. No. 4,837,082, incorporated herein by reference.

Comparison Sample Q, also used in Example 4 above, was also identical to Sample 7 except that Comparison Sample Q contained the magnetic pigment of FIG. 2 instead of the magnetic pigment of FIG. 1.

Comparison Samples R, S, and T were three state-of-the-art, commercially available magnetic recording tapes.

The durability of each of the following samples was measured according to the bin loop durability test. The bin loop durability test is a test performed by cycling a continuous loop of magnetic recording tape through an Electro Sound Series 6000 Bin Loop Playback System for Duplication. This machine stresses the tape by flexing and snapping the tape under high speed (240 inches/s) transport conditions. This procedure tends to cause tape delamination and/or shedding. Failure occurs either when the tape breaks or upon a signal loss of more than 3 dB. The test was stopped if no failure occurred after 100,000 passes. The results were as follows:

| Sample | Pigment loading | Passes to failure |
|--------|-----------------|-------------------|
| 7 | 86% | >100,000 |
| 8 | 86% | 94,824 |
| 9 | 86% | >100,000 |

| Sample | Pigment loading | Passes to failure |
| --- | --- | --- |
| 10 | 86% | >100,000 |
| Q | 86% | 13,380 |
| R | — | 32,400 |
| S | 80% | >100,000 |
| T | — | 32,400 |

The results show that each of Samples 7, 8, 9, and 10 have significantly better durability than Comparison Sample Q. The results also show that samples 7, 8, 9, and 10 were more durable than Comparison Samples R and T and were just as durable as Comparison Sample S.

EXAMPLE 7

The purpose of this experiment was to show the improved adhesion characteristics of the present invention. The samples used in this experiment were obtained as follows:

Samples 11, 12, and 13 were magnetic recording tapes of the present invention containing the magnetic pigment shown in FIG. 1 and were prepared according to the procedure described in Example 1 from the following ingredients in the following amounts:

| Sample | 11 | 12 | 13 |
| --- | --- | --- | --- |
| magnetic oxide loading (dispersion) | 84% | 86% | 88% |
| OA | 28 | 28 | 28 |
| % dispersion solids | 46% | 48% | 50% |
| Charge I | | | |
| Methyl Ethyl Ketone | 61.7 | 63.3 | 65.3 |
| Toluene | 14.7 | 15.0 | 15.3 |
| POCA (75% in Toluene) | 4.0 | 4.0 | 4.0 |
| Emcol Phosphate | 3.0 | 3.0 | 3.0 |
| Estane 5703 (15% in 80:20 MEK/Toluene) | 73.3 | 55.0 | 37.7 |
| Charge II | | | |
| magnetic oxide | 100.0 | 100.0 | 100.0 |
| Lauric Acid | 0.5 | 0.5 | 0.5 |
| Alumina (Al$_2$O$_3$) | 0.5 | 0.5 | 0.5 |

Comparison Samples U, V, and W were identical to Samples 11, 12, and 13, respectively, except that Comparison Samples U, V, and W contained the magnetic pigment shown in FIG. 2 instead of the magnetic pigment shown in FIG. 1.

The adhesion of the magnetizable layer of each of the samples was measured using an Instron Model 1122 tensile tester. The results were as follows:

| Sample | Pigment loading | Average Peel Force (grams) |
| --- | --- | --- |
| 11 | 84% | 135.6 |
| 12 | 86 | 93.4 |
| 13 | 88 | 25.9 |
| U | 84 | 104.8 |
| V | 86 | 54.9 |
| W | 88 | 8.6 |

The results show that the samples of the invention have better adhesion in the same formulation at the same oxide loading than the comparison samples.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit from the invention which is indicated by the following claims.

What is claimed is:

1. A magnetic recording medium, comprising:
   (a) a nonmagnetizable substrate; and
   (b) a magnetizable layer coated onto the nonmagnetizable substrate, comprising:
      (i) a polymeric binder; and
      (ii) from about 83 to about 89 percent by weight of acicular, substantially dendrite-free, iron oxide magnetic pigment particles dispersed in the polymeric binder, wherein the acicular, substantially dendrite-free, iron oxide magnetic pigment particles have an oil absorption number of less than about 40.

2. The magnetic recording medium of claim 1, wherein the magnetic pigment particles are undoped gamma-Fe$_2$O$_3$ magnetic pigment particles.

3. The magnetic recording medium of claim 1, wherein the magnetic pigment particles comprise from about 84 to about 86 percent by weight of the magnetizable layer.

4. The magnetic recording medium of claim 1, wherein the magnetic pigment particles comprise about 86 percent by weight of the magnetizable layer.

5. The magnetic recording medium of claim 1, wherein the magnetic pigment particles have an oil absorption number of about 28.

6. The magnetic recording medium of claim 1, wherein the magnetic pigment particles have an aspect ratio of about 6:1, a length of about 0.6 microns, and a BET specific surface area of 23±3 m$^2$ per gram.

7. The magnetic recording medium of claim 1, wherein the substrate is primed in order to improve the adhesion of the magnetizable layer to the substrate.

8. The magnetic recording medium of claim 1, wherein the polymeric binder comprises a cross-linkable polyurethane polymer.

9. The magnetic recording medium of claim 8, wherein the cross-linkable polyurethane polymer is a polyester polyurethane obtained by reacting monomer units which comprise:
   (a) about 50 percent by weight butanediol;
   (b) about 30 percent by weight adipic acid; and
   (c) about 20 percent by weight of methylene diisocyanate.

10. The magnetic recording medium of claim 8, wherein the cross-linkable polyurethane polymer is a sulfonated, hydroxy-functional polyurethane polymer.

11. The magnetic recording medium of claim 8, wherein the polymeric binder further comprises from about 1 to about 95 parts by weight of a hard resin component.

12. The magnetic recording medium of claim 9, wherein the polymeric binder further comprises from about 1 to 95 parts by weight of a hard component resin.

13. The magnetic recording medium of claim 12, wherein the polymeric binder comprises from about 80 to about 95 percent of the cross-linkable polyester polyurethane polymer and from about 5 to about 20 percent by weight of the hard component resin.

14. A method of making a magnetic recording medium, comprising the steps of:
   (a) providing acicular, substantially dendrite-free, iron oxide magnetic pigment particles, wherein the particles have an oil absorption number of less than about 40;

(b) dispersing from about 83 to about 89 percent by weight of the magnetic pigment particles in a polymeric binder to form a dispersion; and (c) coating the dispersion onto a magnetizable substrate.

15. The method of claim 14, wherein the magnetic pigment particles are undoped gamma-$Fe_2O_3$ magnetic pigment particles.

16. The method of claim 14, wherein the magnetic pigment particles comprise from about 84 to about 86 percent by weight of the magnetizable layer.

17. The method of claim 14, wherein the magnetic pigment particles comprise about 86 percent by weight of the magnetizable layer.

18. The method of claim 16, wherein the magnetic pigment particles have an oil absorption number of about 28.

19. The method of claim 16, wherein the magnetic pigment particles have an aspect ratio of about 6:1, a length of about 0.6 microns, and a BET specific surface area of $23 \pm 3$ m$^2$ per gram.

20. The method of claim 14, wherein the substrate is primed in order to improve the adhesion of the magnetizable layer to the substrate.

21. The method of claim 14, wherein the polymeric binder comprises a cross-linkable polyurethane polymer.

22. The method of claim 21, wherein the crosslinkable polyurethane polymer is a polyester polyurethane obtained by reacting monomer units which comprise:
(a) about 50 percent by weight butanediol;
(b) about 30 percent by weight adipic acid; and
(c) about 20 percent by weight of methylene diisocyanate.

23. The method of claim 21, wherein the crosslinkable polyurethane polymer is a sulfonated, hydroxyfunctional polyurethane polymer.

24. The method of claim 21,, wherein the polymeric binder further comprises from about 1 to about 95 parts by weight of a hard resin component.

25. The method of claim 28, wherein the polymeric binder further comprises from about 1 to 95 parts by weight of a hard component resin.

26. The method of claim 25, wherein the polymeric binder comprises from about 80 to about 95 percent of the cross-linkable polyester polyurethane polymer and from about 5 to about 20 percent by weight of the hard component resin.

* * * * *

UNITED STATES PATENT AND TRADEMARK OFFICE
CERTIFICATE OF CORRECTION

PATENT NO. : 5,028,483
DATED : July 2, 1991
INVENTOR(S) : John G. Chernega and Verna M. Kubik It is certified that error appears in the above-identified patent and that said Letters Patent is hereby corrected as shown below:

On the title page item [75];
"John G. Chernega, Stillwater; Verna M. Kubik, Village of Houlton, both of Wis." should read:

--Inventors: John G. Chernega, Stillwater, Minnesota; Verna M. Kubik, Village of Houlton, Wisconsin--

Abstract, line 4, "substantialy" should be --substantially--.

Col. 8, line 32, "the" should be --The--.

Col. 13, line 55, delete "a" (after "that" and before "Comparison")

Signed and Sealed this

Sixteenth Day of February, 1993

Attest:

STEPHEN G. KUNIN

Attesting Officer

Acting Commissioner of Patents and Trademarks